(12) United States Patent
Gobert

(10) Patent No.: US 6,856,703 B1
(45) Date of Patent: Feb. 15, 2005

(54) FILTERING A COLLECTION OF SAMPLES

(75) Inventor: Jean Gobert, Maisons-Alfort (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/503,967

(22) Filed: Feb. 14, 2000

(30) Foreign Application Priority Data

Feb. 26, 1999 (EP) .......................................... 99400475

(51) Int. Cl.$^7$ .............................................. G06K 9/40
(52) U.S. Cl. ................................................. 382/260
(58) Field of Search ........................ 382/254, 260–266, 382/275, 270; 702/190; 710/55; 348/606, 607, 610

(56) References Cited

U.S. PATENT DOCUMENTS

| | | | | |
|---|---|---|---|---|
| 5,231,680 A | * | 7/1993 | Williams | ..................... 382/261 |
| 5,422,827 A | * | 6/1995 | Niehaus | ...................... 702/190 |
| 5,694,490 A | * | 12/1997 | Howell et al. | .............. 382/260 |
| 5,887,197 A | * | 3/1999 | Isomura | ........................ 710/55 |

* cited by examiner

Primary Examiner—Vikkram Bali

(57) ABSTRACT

A collection of samples $S_i$, representing, for example, an image is filtered in the following manner. A distinction is made between valid samples $S_{i+}$ and non-valid samples $S_{i-}$ on the basis of auxiliary data AUX. Filtered samples $S_o$, which are associated with the valid samples $S_{i+}$, are derived exclusively on the basis of the valid samples $S_{i+}$. Accordingly, it is prevented that the filtered samples, which are associated with the valid samples, are mixtures of valid and non-valid samples. Such mixtures cause distortion, in particular if the valid and non-valid samples substantially differ in value.

7 Claims, 3 Drawing Sheets

FILTERING A COLLECTION OF SAMPLES

FIELD OF THE INVENTION

The invention relates to filtering a collection of samples. Such filtering may be applied, for example, in image processing prior to an image-processing operation like up-sampling, down-sampling or warping.

BACKGROUND ART

WO-A-98/06064 describes post-processing of a computer-generated image of a three-dimensional object for display as a pixel image. A focus depth is specified either by the user or from within the system for each image frame. The image pixels are grouped in non-overlapping blocks of adjoining image pixels with a single respective depth value pre-specified or calculated at run-time for each block. Each block is extracted in turn from the image, and the pixels within a block are filtered with a common set of filter coefficients. Padding may be applied to fill areas where a full filter kernel cannot be formed. An example of padding is repeating pixel edge values or "wrapping round" values from the opposite edge of the block in order to provide sufficient values of the right general order to construct a filter kernel centered on these pixels in the boundary area.

SUMMARY OF THE INVENTION

It is an object of the invention that a wide variety of collections of samples can be satisfactorily filtered.

The invention takes the following aspects into consideration. Filtering a collection of samples usually implies that a cluster of samples is formed for each sample, the cluster comprising the sample itself and neighboring samples. A filtered sample is derived from the cluster, for example, by applying a certain function to the cluster of samples. The filtered sample thus obtained is associated with the sample for which the cluster was formed.

For the purpose of filtering, it is convenient to structure a collection of samples in such way that clusters of samples can easily be formed. For example, let it be assumed that a collection of samples represents a two-dimensional image. It is then convenient to structure the collection of samples as a matrix.

Let it be assumed that a structured collection of samples represents a multidimensional entity having an irregular shape. This implies that some samples are valid because they belong to the entity, whereas other samples are not valid because they do not belong to the entity. For example, an image may be a composition of various arbitrarily shaped objects. Let it be assumed that the image is represented by a collection of samples which is structured as a matrix. The collection of samples constitutes, as it were, a rectangular bounding box which contains the image. Some samples will belong to the image and will thus be valid, whereas other samples will not belong to the image and will thus not be valid.

The following problem may occur in filtering a structured collection of samples which represents a multidimensional entity having an irregular shape. Some filtered samples will be derived from clusters comprising one or more samples which are valid because they belong to the entity, and one or more samples which are not valid because they do not belong to the entity. That is, some filtered samples will, in effect, be mixtures of valid and non-valid samples. The filtered samples will thus represent the entity with a certain degree of distortion. This distortion will be relatively severe if non-valid samples substantially differ in value from valid samples.

In accordance with the invention, a distinction between valid samples and non-valid samples is made on the basis of auxiliary data. Filtered samples, which are associated with the valid samples, are derived exclusively on the basis of the valid samples.

Accordingly, in the invention, it is prevented that the filtered samples, which are associated with the valid samples, are affected by a non-valid sample. Thus, supposing that the collection of samples represents an entity with samples belonging to the entity and samples not belonging to the entity, it can be prevented that filtering the collection of samples entails a distortion of the entity. Consequently, the invention allows a satisfactory result in terms of distortion without this requiring that all samples are valid or that any non-valid sample does not substantially differ in value from the valid samples. Thus, the invention allows satisfactory filtering of a wide variety of collections of samples.

The invention and additional features, which may be optionally used to implement the invention to advantage, are apparent from and will be elucidated with reference to the drawings described hereinafter.

DETAILED DESCRIPTION OF THE DRAWINGS

First, some remarks will be made on the use of reference signs. Similar entities are denoted by an identical letter code throughout the drawings. Various similar entities may be shown in a single drawing. In that case, a numeral is added to the letter code so as to distinguish similar entities from each other. The numeral will be between parentheses if the number of similar entities is a running parameter. In the description and the claims, any numeral in a reference sign may be omitted if this is appropriate.

Figure 1:
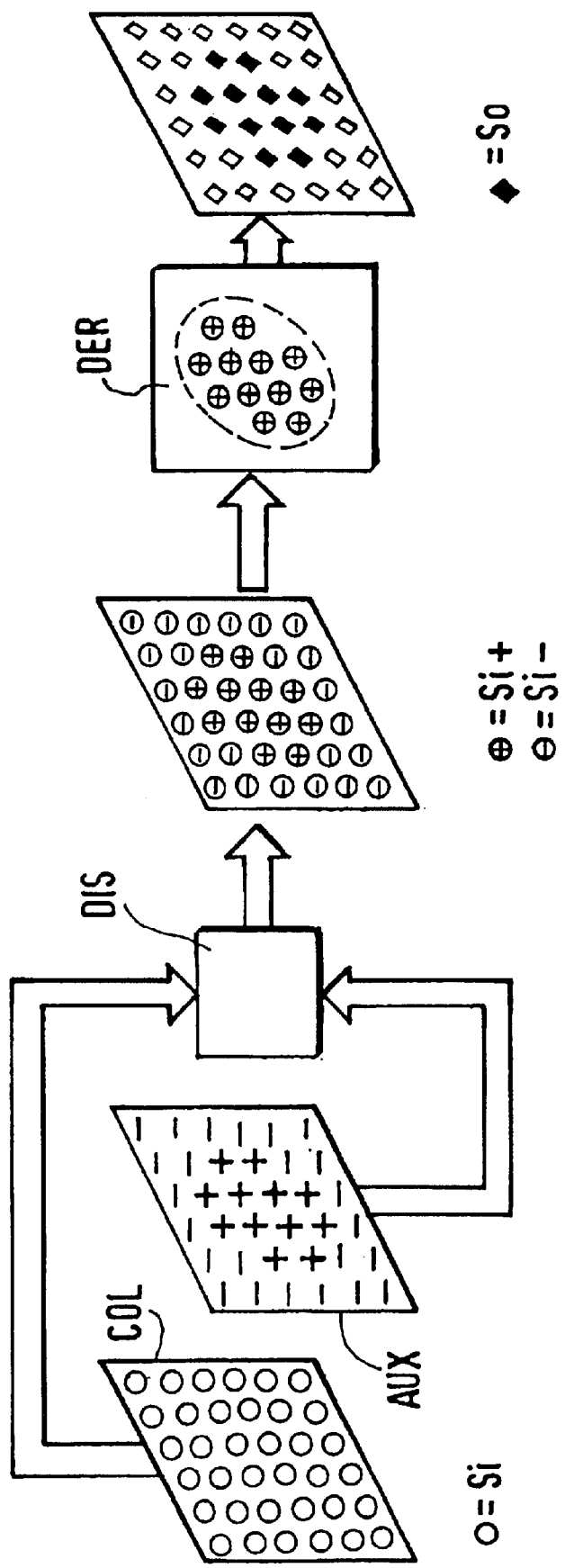
FIG. 1 is a conceptual diagram illustrating basic features of the invention as claimed in claim 1.

FIG. 1 illustrates basic features of the invention. A collection COL of samples Si is filtered in the following manner. A distinction DIS is made between valid samples Si+ and non-valid samples Si− on the basis of auxiliary data AUX. Filtered samples So, which are associated with the valid samples Si+, are derived DER exclusively on the basis of the valid samples Si+.

There are various manners in which the filtered samples that are associated with the valid samples may be exclusively derived from the valid samples. For example, let it be assumed that a cluster of samples is formed so as to derive a filtered sample. It is then possible to make a weighed combination of the valid samples in the cluster only, the weighing factors depending on the number of valid samples in the cluster. This may be realized by means of a filter of variable length, with a different set of filter coefficients for each length. However, such a filter is generally relatively costly. It is therefore preferable to use a filter of fixed length.

A fixed-length filter can be used in the following embodiment. A filtered sample is derived from a set of filter input values which is fixed in size. Each filter input value is associated with a specific sample. If the sample is valid, the value of the sample is taken as the filter input value. If the sample is not valid, a padding value is taken as the filter input value. The padding value is derived from at least one valid sample. For example, the padding value could be the mean value of all valid samples. However, such a calculation is generally time-consuming and requires a relatively large memory.

A relatively fast padding value calculation can be made as follows. A cluster of samples is formed. A padding value is calculated on the basis of valid samples in the cluster. A set of filter values is formed by taking, for each valid sample, the value of that sample and by taking the padding value for each non-valid sample. A filtered sample is derived from the cluster of filter input values.

The features illustrated in FIG. 1 may be applied, for example, to process image data which is composed of texture data and shape data. Such a composition will be used in a video coding standard commonly referred to as MPEG-4. In MPEG-4, the texture data is formed by one or more blocks of image samples. The shape data is formed by a bitmap in which each bit is associated with a specific image sample. The value of the bit indicates whether or not the image sample concerned belongs to an object, or a composition of objects, which the image data represents. The bits of the bitmap, which constitutes the shape data, will hereinafter be referred to as shape bits.

Figure 2:
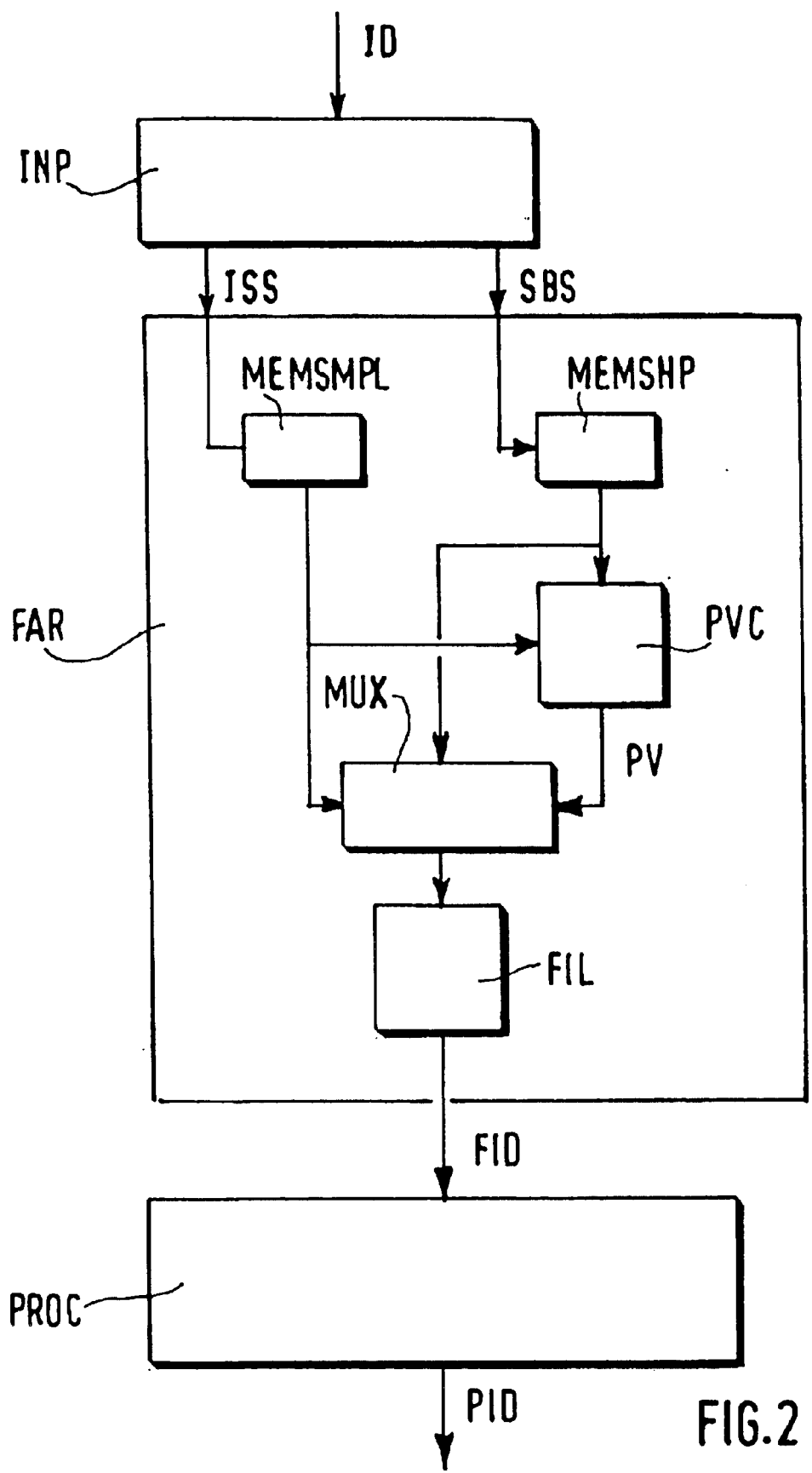
FIG. 2 is a block diagram illustrating an example of an MPEG-4 image processing arrangement in accordance with the invention.

FIG. 2 illustrates an MPEG-4 image-processing arrangement which recaptures the features illustrated in FIG. 1. The image-processing arrangement comprises a receiving section INP, a filter arrangement FAR and an image processor PROC. In more detail, the filter arrangement FAR comprises a sample memory MEMSMPL, a shape memory MEMSHP, a padding-value calculator PVC, a multiplexer MUX and a filter FIL.

The image-processing arrangement operates as follows. The receiving section INP receives image data ID. The image data ID contains one or more blocks of image samples representing an object or a composition of objects. The image data ID further contains a bitmap associated with the one or more blocks of image samples. The receiving section INP provides a stream of image samples ISS and a stream of shape bits SBS. The streams are synchronized. That is, when the input section provides an image sample, it simultaneously provides the shape bit associated with that image sample.

Figure 3:
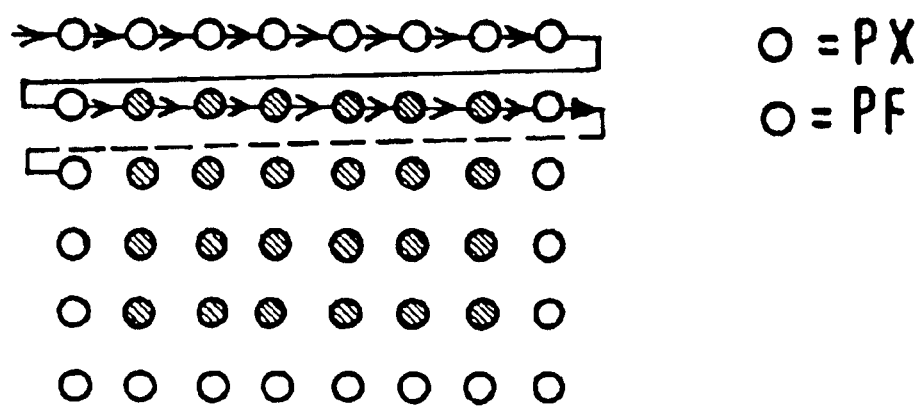
FIG. 3 is a conceptual diagram illustrating how a stream of image samples can be formed in the MPEG-4 image-processing arrangement illustrated in FIG. 2.

FIG. 3 illustrates how the stream of image samples ISS is formed. Since the stream of shape bits SBS is synchronous with the stream of image samples ISS, both have the same format. FIG. 3 shows a matrix composed of true image samples PX and filler image samples PF. The true image samples PX originate from the image data ID. The filler image samples PF have been added to the true image samples in order that the filter arrangement FAR provides a number of filtered image samples corresponding to the number of image samples contained in the input data ID. The streams of image samples ISS is formed by scanning, as it were, each row from the matrix concerned from the left to the right. The scanning starts at the upper row and ends at the bottom row. With each filler image sample PF, the receiving section INP simultaneously provides a shape bit indicating that the filler image sample PF is not valid.

The filter arrangement FAR successively forms different clusters of image samples and clusters of associated shape bits, and derives a filtered image sample from each cluster of image samples. The sample memory MEMSMPL and the shape memory MEMSHP are first-in-first-out (FIFO) memories which receive the stream of image samples ISS and the stream of shape bits SBS, respectively. A new cluster of image samples is thus formed when a subsequent image sample in the stream of image samples ISS is written into the sample memory MEMSMPL, while deleting the image sample which has been first written into the sample memory MEMSMPL. Similarly, a new cluster of shape bits is formed when a subsequent shape bit in the stream of shape bits SBS is written into the shape memory MEMSHP, while deleting the shape bit which has been first written into the sample memory MEMSHP.

The filter arrangement FAR derives a filtered image sample from a cluster of image samples contained in the sample memory MEMSMPL. It may happen that the cluster does not contain any image sample which is valid. In that particular case, the filter arrangement FAR may provide a filtered image sample which is, for example, a do-not-care value or a non-valid sample in the cluster. It will hereinafter be assumed that there is at least one valid sample in the cluster of image samples.

The padding-value calculator PVC calculates a padding value PV on the basis of valid image pixels contained in the cluster. The padding-value calculator PVC can determine whether an image sample is valid or not by means of the shape bits contained in the shape memory MEMSHP.

There are various different manners in which the padding-value calculator PVC may derive the padding value PV from the valid image samples. For example, the padding value may be the arithmetic mean value of all valid image samples in a cluster. As another example, the padding value PV may be an approximated arithmetic mean value being the sum of all valid samples divided by a value which is the integer to the power of two nearest to the number of valid samples. The calculation of this approximated arithmetic mean value requires one or more addition and bit-shift operations only. Such operations can be carried out relatively quickly and with relatively simple hardware. As yet another example, the padding value PV may be the median value of all valid samples in the cluster. In that case, the padding-value calculator may be implemented using comparators and multiplexers only.

The multiplexer MUX successively reads the shape bits contained in the shape memory MEMSHP. If a shape bit indicates that the image sample with which it is associated is valid, the image sample is a true image sample PX. In that case, the multiplexer MUX supplies the value of the image sample concerned to the filter FIL. If, however, a shape bit indicates that the image sample with which it is associated is not valid, the image sample is a filler image sample PF. In that case, the multiplexer MUX supplies the padding value PV to the filter FIL.

The filter FIL makes a weighed combination of the values it receives from the multiplexer MUX. The weighed combination of these values constitutes a filtered image sample. The weighing factors are filter coefficients. There is a specific filter coefficient for each position in a cluster.

The filter arrangement FIL carries out the above-described operations for each different cluster of image samples and associated shape bits. Accordingly, a collection of filtered image samples will be obtained. The collection of filtered image samples constitutes the filtered image data FID.

The image processor PROC processes the filtered image data so as to obtain processed image data. The image processor PROC may carry out an image-processing operation like, for example, up-sampling, down-sampling or warping.

The drawings and their description hereinbefore illustrate rather than limit the invention. It will be evident that there are numerous alternatives which fall within the scope of the appended claims. In this respect, the following closing remarks are made.

There are numerous ways of physically spreading functions or functional elements over various units. In this respect, the drawings are very diagrammatic, each representing only one possible embodiment of the invention. Thus, although a drawing shows different functional elements as different blocks, this by no means excludes that some, or all, functional elements may be implemented as a single physical unit.

There are numerous manners of forming clusters of image samples. FIG. 2 only illustrates one possible implementation in which clusters of image samples are formed by supplying a stream of image samples to a FIFO memory. An other possible implementation is to store all image samples, and the associated bitmap, in accordance with a certain format. An address generator successively generates different groups of addresses. The image samples stored under a group of addresses forms a cluster from which a filtered image sample can be derived in accordance with the basic principle illustrated in FIG. 1.

Any reference sign in a claim should not be construed as limiting the claim.

What is claimed is:

1. A method of filtering a collection of samples, a sample being associated with an auxiliary data item, the method comprising the steps of:

distinguishing between valid samples and non-valid samples of the collection of samples on the basis of the associated auxiliary data item, wherein valid samples belong to one or more video objects and non-valid samples do not, and computing a filtered value of a valid sample on the basis of a weighted combination of a set of values which are derived from input values of valid samples.

2. The method as claimed in claim 1, further comprising a step of calculating a padding value on the basis of input values of valid samples, and wherein the computing step is adapted to compute a filtered value of a valid sample on the basis of a weighted combination of values of a cluster of samples including the input value of each valid sample in the cluster and the padding value for each non-valid sample in the cluster.

3. The method as claimed in claim 2, wherein the padding value is calculated on the basis of the valid samples in the cluster.

4. A method as claimed in claim 1, wherein the cluster of samples is fixed in size.

5. A method as claimed in claim 1, wherein the samples are texture data and the auxiliary data are shape data.

6. A filter arrangement for filtering a collection of samples, said filter arrangement being configured to receive said samples and auxiliary data items associated with said samples, comprises:

a multiplexing circuit for distinguishing between valid samples and non-valid samples of the collection of samples on the basis of the associated auxiliary data item, wherein valid samples belong to one or more video objects and non-valid samples do not, and a filtering circuit for computing a filtered value of a valid sample on the basis of a weighted combination of a set of values which are derived from input values of valid samples.

7. The filter arrangement as claimed in claim 6, further comprising a padding value calculator circuit for calculating a padding value on the basis of input values of valid samples, and wherein the filtering circuit is configured to compute a filtered value of a valid sample on the basis of a weighted combination of values of a cluster of samples including the input value of each valid sample in the cluster and the padding value for each non-valid sample in the cluster.

* * * * *